United States Patent
Roy et al.

(10) Patent No.: US 8,483,114 B2
(45) Date of Patent: *Jul. 9, 2013

(54) METHOD AND SYSTEM FOR PEER-TO-PEER COMMUNICATION AMONG SITES

(75) Inventors: Arindam Roy, Plano, TX (US); Jeffery E. Benshetler, Irving, TX (US)

(73) Assignee: E.F. Johnson Company, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,895

(22) Filed: Oct. 3, 2011

(65) Prior Publication Data

US 2012/0083307 A1  Apr. 5, 2012

Related U.S. Application Data (63) Continuation of application No. 11/937,963, filed on Nov. 9, 2007, now Pat. No. 8,059,574.

(60) Provisional application No. 60/950,870, filed on Jul. 19, 2007, provisional application No. 60/963,131, filed on Aug. 2, 2007.

(51) Int. Cl.
*H04H 20/71* (2008.01)
*H04W 4/00* (2009.01)
*H04J 3/26* (2006.01)
*H04J 3/16* (2006.01)

(52) U.S. Cl.
USPC ........... 370/312; 370/329; 370/432; 370/437; 370/261; 370/263

(58) Field of Classification Search
USPC ................. 370/259–261, 263, 270, 312, 328, 370/329, 432, 437
See application file for complete search history.

(56) References Cited

U.S. PATENT DOCUMENTS

| | | | |
|---|---|---|---|
| 5,850,444 | A | 12/1998 | Rune |
| 6,941,457 | B1 | 9/2005 | Gundavelli et al. |
| 7,056,217 | B1 | 6/2006 | Pelkey et al. |
| 7,221,660 | B1 | 5/2007 | Simonson et al. |
| 7,636,339 | B2 | 12/2009 | Shaffer et al. |
| 7,764,633 | B2 | 7/2010 | Marque-Pucheu |
| 7,929,475 | B2 | 4/2011 | Simonson et al. |
| 8,059,574 | B2 | 11/2011 | Roy et al. |

(Continued)

OTHER PUBLICATIONS

Telecommunications Industry Association (TIA) with Electronic Industries Alliance (EIA), TIA/EIA Standard: Project 25—Trunking Control Channel Messages New Technology Standards Project Digital Radio Technical Standards (ANSI/TIA/EIA-102.AABC), May 2000, Telecommunications Industry Association (TIA), Arlington, VA (150 pages).

(Continued)

*Primary Examiner* — Ronald Abelson
(74) *Attorney, Agent, or Firm* — Gardere Wynne Sewell LLP (57) ABSTRACT

A method and system is provided for peer-to-peer communication among a plurality of sites in a land mobile radio (LMR) system. The sites are interconnected by a data network, such as an IP network. When a site, referred to as the initiating site, intends to communicate with other sites, the initiating site transmits a call request message. The call request message is multicast over the data network to the intended recipients. The initiating site receives an acknowledgement message from the other sites confirming their willingness to communicate with the initiating site. The initiating site then sends a voice message, via multicasting, to the other sites interested in the call.

21 Claims, 8 Drawing Sheets

U.S. PATENT DOCUMENTS

| | | | |
|---|---|---|---|
| 2005/0180448 A1 | 8/2005 | Kobayashi |
| 2006/0262800 A1 | 11/2006 | Martinez et al. |
| 2007/0104121 A1 | 5/2007 | Shaffer et al. |
| 2007/0242670 A1 | 10/2007 | Simonson et al. |
| 2007/0259692 A1 | 11/2007 | Venkatachalam |
| 2008/0123650 A1 | 5/2008 | Bhaskar |
| 2008/0144644 A1 | 6/2008 | Allan et al. |
| 2009/0024845 A1 | 1/2009 | Benshetler et al. |
| 2010/0020735 A1 | 1/2010 | Roy et al. |

OTHER PUBLICATIONS

Telecommunications Industry Association (TIA) with Electronic Industries Alliance (EIA), TIA/EIA Standard: Project 25—Trunking Control Channel Messages, Addendum 1, SNDCP Trunking Control Channel Messages (ANSI/TIA/EIA-102.AABC-1), Sep. 2001, Telecommunications Industry Association (TIA), Arlington, VA (11 pages).

Telecommunications Industry Association (TIA) with Electronic Industries Alliance (EIA), TIA Standard: Project 25—Trunking Control Channel Messages, Addendum 2—Multiband Operations, New Technology Standards Project Digital Radio Technical Standards (ANSI/TIA-102.AABC-2), Dec. 2002, Telecommunications Industry Association (TIA), Arlington, VA (39 pages).

Telecommunications Industry Association (TIA) with Electronic Industries Alliance (EIA), TIA/EIA Telecommunications Systems Bulletin, APCO Project 25—Trunking Overview (TSB102.AABA), Apr. 1995, Telecommunications Industry Association (TIA), Arlington, VA (12 pages).

Office Action dated Dec. 17, 2010 issued in U.S. Appl. No. 11/940,936 (12 pages).

Final Office Action dated Jul. 1, 2011 issued in U.S. Appl. No. 11/940,936 (16 pages).

2nd Notice of Allowance dated Jul. 1, 2011 issued in U.S. Appl. No. 11/937,963 (7 pages).

1st Notice of Allowance dated Mar. 4, 2011 issued in U.S. Appl. No. 11/937,963 (5 pages).

Office Action dated Oct. 15, 2010 issued in U.S. Appl. No. 11/937,963 (15 pages).

PRIOR ART

PRIOR ART

FIG. 3

PRIOR ART

METHOD AND SYSTEM FOR PEER-TO-PEER COMMUNICATION AMONG SITES

CROSS-REFERENCE TO RELATED APPLICATIONS

Pursuant to 35 U.S.C. §120, this continuation application claims priority from co-pending U.S. patent application Ser. No. 11/937,963, entitled Method and System for Peer-to-Peer Communication Among Sites, naming Arindam Roy and Jeffery E. Benshetler as inventors, filed Nov. 9, 2007, which pursuant to 35 U.S.C. §119 (e), claims the benefit of U.S. Provisional Patent Application Ser. No. 60/950,870, entitled Method and System for Peer-to-Peer Communication Among Control Stations naming Jeffery E. Benshetler and Arindam Roy as inventors, filed Jul. 19, 2007, and U.S. Provisional Patent Application Ser. No. 60/963,131 entitled APCO 07 Brochure for End-To-End Encryption and Peer-To-Peer Communication, naming Jeffery E. Benshetler and Arindam Roy as inventors, filed Aug. 2, 2007. The contents of these aforementioned United States patent applications are incorporated by reference herein in their entirety for any and all purposes.

TECHNICAL FIELD OF THE INVENTION

The invention relates generally to communication systems. More specifically, but not by way of limitation, the invention relates to a method and system for peer-to-peer communication among sites such as, for example, those sites in a Land Mobile Radio (LMR) communication systems.

BACKGROUND OF THE INVENTION

LMR systems are deployed by organizations requiring instant communication between geographically dispersed and mobile personnel. Typical users of LMR systems include police departments, fire departments, medical personnel, EMS and the military.

Current LMR systems can be configured to provide for radio communications between a site and subscriber units in the field. A subscriber unit may be a mobile unit or a portable unit. LMR systems can be as simple as two subscriber units communicating between themselves and a site over preset channels, or they can be complex consisting of hundreds of subscriber units and multiple sites.

LMR systems may be configured to cover a large geographical area by providing hundred of sites. Communication among the sites is necessary in various situations. At present, sites generally cannot communicate directly with each other, but require the assistance of a bridge device to facilitate communication among the sites. As will be explained below, the requirement of a bridge device to facilitate communication among the sites has numerous disadvantages.

FIGS. 1-4 illustrate communication among sites 104, 108 and 112 via a bridge device 116. The sites 104, 108, 112 and the bridge device 116 are interconnected by a data network (not shown in FIGS. 1-4). The data network can be an IP network. However, the data network may also be any other type of network (e.g., packet switched network, ATM network).

Figure 1:
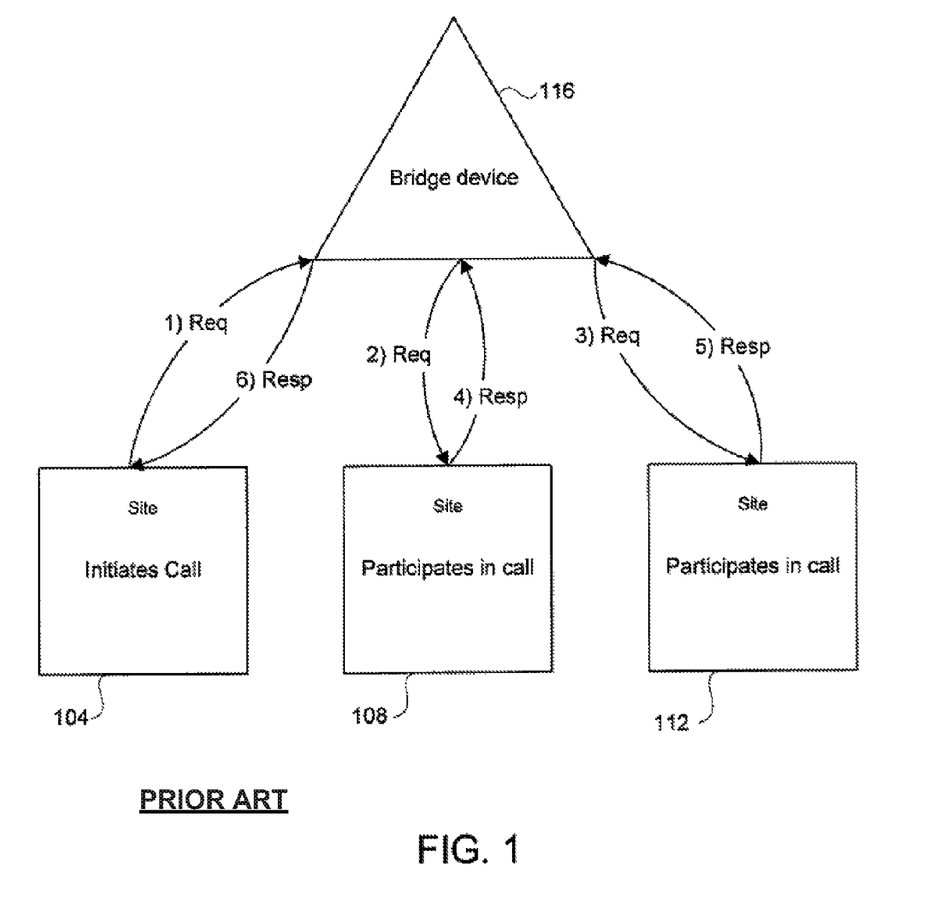
FIGS. 1-4 illustrate a conventional call setup and communication involving three sites and a bridge device.

Consider, for example, that the site 104 desires to exchange voice messages with the sites 108 and 112. Prior to the exchange of any voice messages, the bridge device 116 must setup the call. Referring now to FIG. 1, the site 104 first sends a request message to the bridge device 116 that it intends to communicate with the sites 108 and 112. Next, the bridge device 116 forwards the request message to each of the sites 108 and 112 inquiring if they would like to participate in a call. Note that the bridge device 116 must forward the request message to each of the sites 108 and 112 separately since the bridge device 116 can only send one request message at a time. Next, the bridge device 116 receives response messages from the sites 108 and 112 confirming or acknowledging that they would participate in the call. Again, note that the bridge device 116 can only receive one response message at a time. The call setup concludes when the bridge 116 notifies the site 104 that the sites 108 and 112 are willing to participate in the call. As can be seen, the call setup involves at least six hops. Also the bridge introduces additional latency due to the increased hop count resulting in increased call setup time for every setup message that is processed by the bridge device 116. Further, the bridge device 116 is a single point of failure because a failure of the bridge device 116 will shut down communication among the sites, thus making the system less reliable. The signals exchanged among the bridge device 116 and the sites 104, 108 and 112 during the call setup are sometimes referred to as "control plane" signals.

Figure 2:
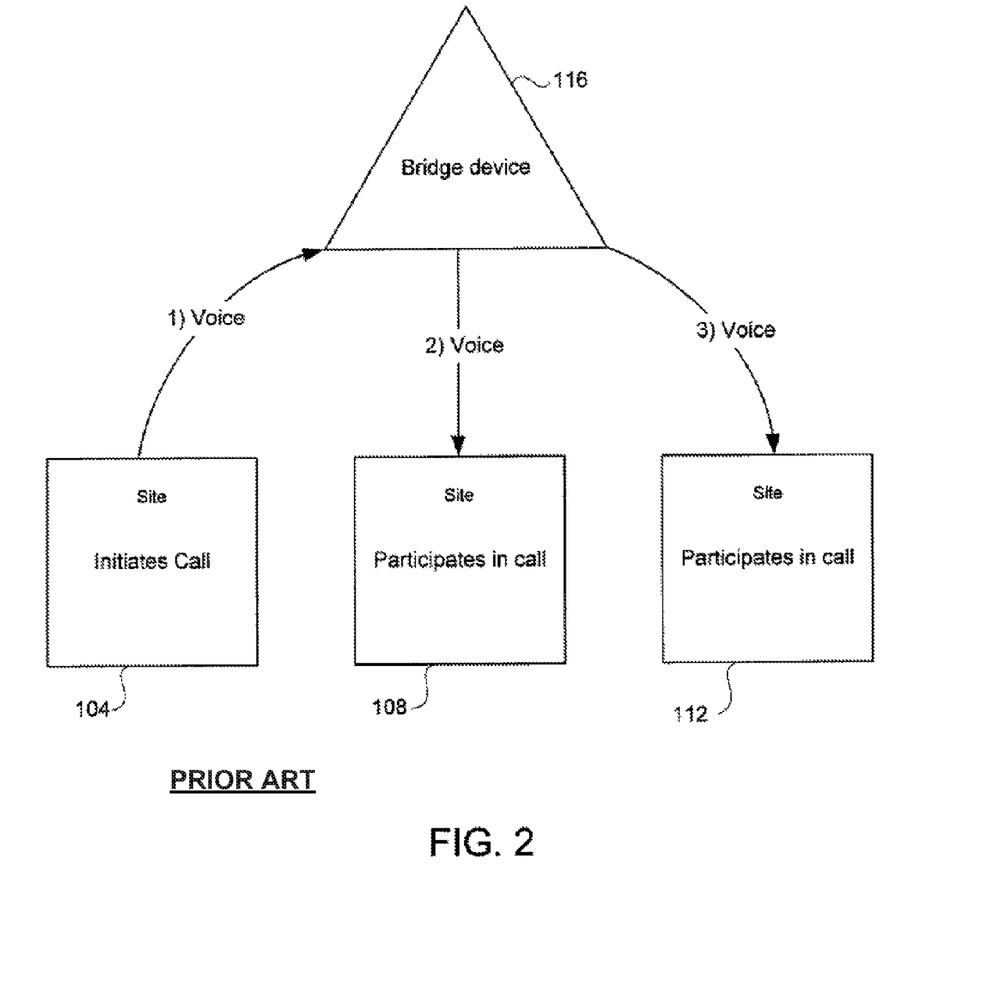

After the call setup, communication among the sites 104, 108 and 112 may proceed. FIG. 2 illustrates the transmission of a voice message from the site 104 to the sites 108 and 112. A voice message originating from the site 104 is first transmitted to the bridge device 116. The bridge device then separately forwards the voice message to each of the sites 108 and 112.

Figure 3:
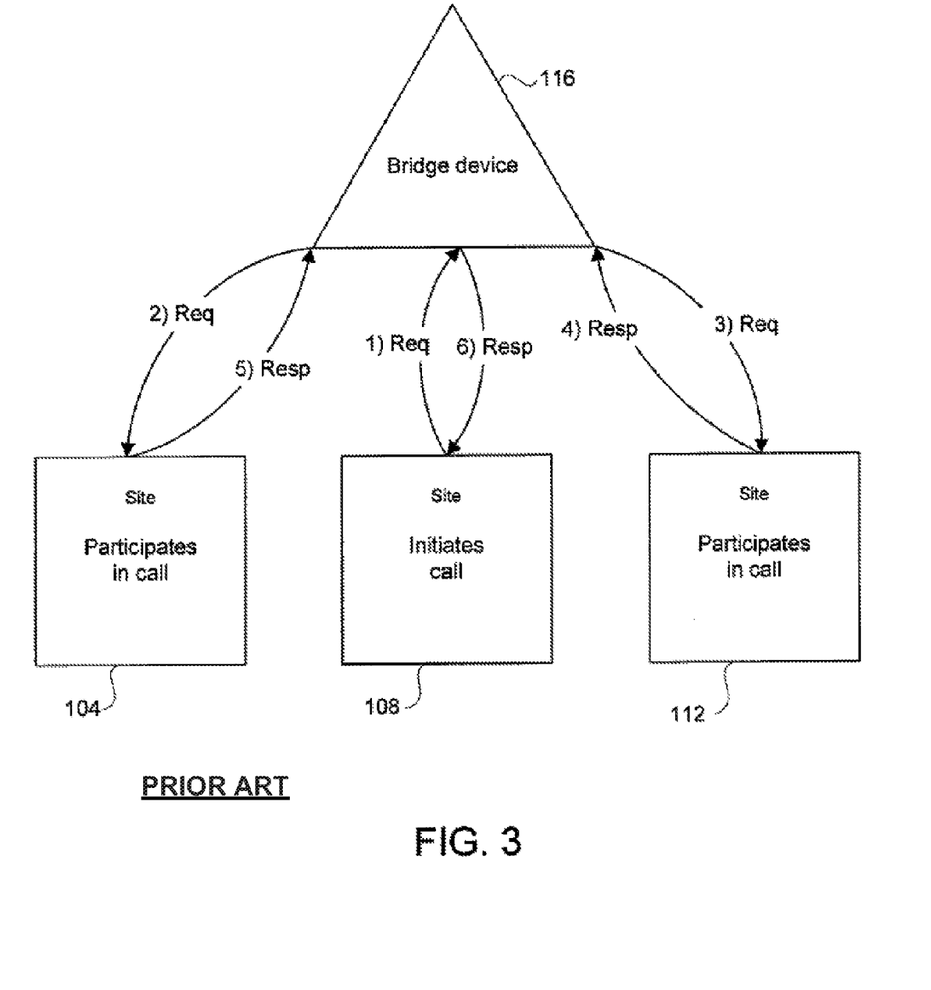

Consider that the site 108 desires to respond back to the site 104 and also communicate with the site 112. Referring now to FIG. 3, the site 108 sends a request message to the bridge device 116 that it wants to communicate with the sites 104 and 112. Next, the bridge device 116 forwards the request message to each of the sites 104 and 112 inquiring if they would like to participate in a call. Next, the bridge device 116 receives response messages from the sites 104 and 112 confirming or acknowledging that they would participate in the call. The call setup concludes when the bridge 116 notifies the site 108 that the sites 104 and 112 are willing to participate in the call. As can be seen, the call setup involves at least six hops.

Figure 4:
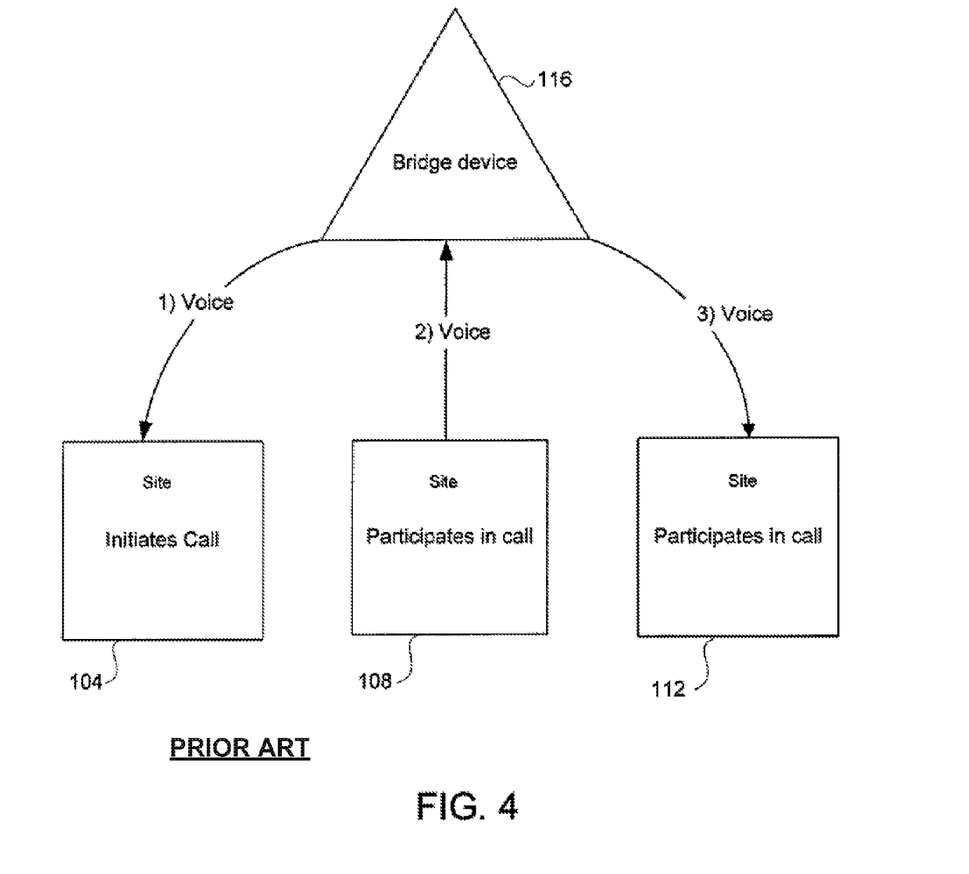

After the call setup process described above, communication among the sites 104, 108 and 112 may proceed. FIG. 4 illustrates the transmission of voice messages from the site 108 to the site 104 and 112. Again, the bridge device 116 first receives a voice message from the site 108, which is forwarded to the sites 104 and 112.

In the control plane, the bridge device 116 introduces undesired latency during the call setup due to increased hop count. In the bearer plane, voice messages must go through the bridge device 116, introducing an extra hop and latency. Also, since all control plane and bearer plane traffic must go through the bridge device 116, a single point of failure is created at the bridge device 116 for both call setup and voice communications. Furthermore, the bridge device 116 is typically heavily loaded as all control plane and bearer plane traffic must go through the bridge device 116. This often results in a requirement that the bridge device 116 be high capacity and extremely robust, and, hence, very expensive.

Also since the bridge device forwards the voice messages to the other sites, the bridge device requires additional bandwidth for each additional site that it needs to forward voice messages. Moreover, the bridge device must be aware of all sites in a particular deployment. As a result, when a new site is deployed in a system, the bridge device needs to be notified about the site.

SUMMARY OF THE INVENTION

A method and system for communication among a plurality of sites may be used in a land mobile radio (LMR) system or any other type of communication system. The plurality of sites are interconnected by a data network such as an IP network.

The method includes transmitting by the sites their respective identity information. The identity information includes a list of one or more sites from which each site will accept messages. The method further includes receiving at the sites the transmitted identity information. Each site becomes a member of a talk group comprising a plurality of sites that accept messages from each other. The method further includes transmitting a call request message by an initiating site that intends to communicate with one or more sites in the system. The call request message is being multicast over the data network as call request packets. The method further includes receiving, by the initiating site, an acknowledgement message from the other sites confirming their willingness to communicate with the initiating site. The acknowledgement message is unicast over the data network as acknowledgement packets. The method further includes transmitting, by the initiating site, a voice message. The voice message is multicast over the data network as voice packets. The method further includes receiving the multicast voice packets at the other sites.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

Figure 5:
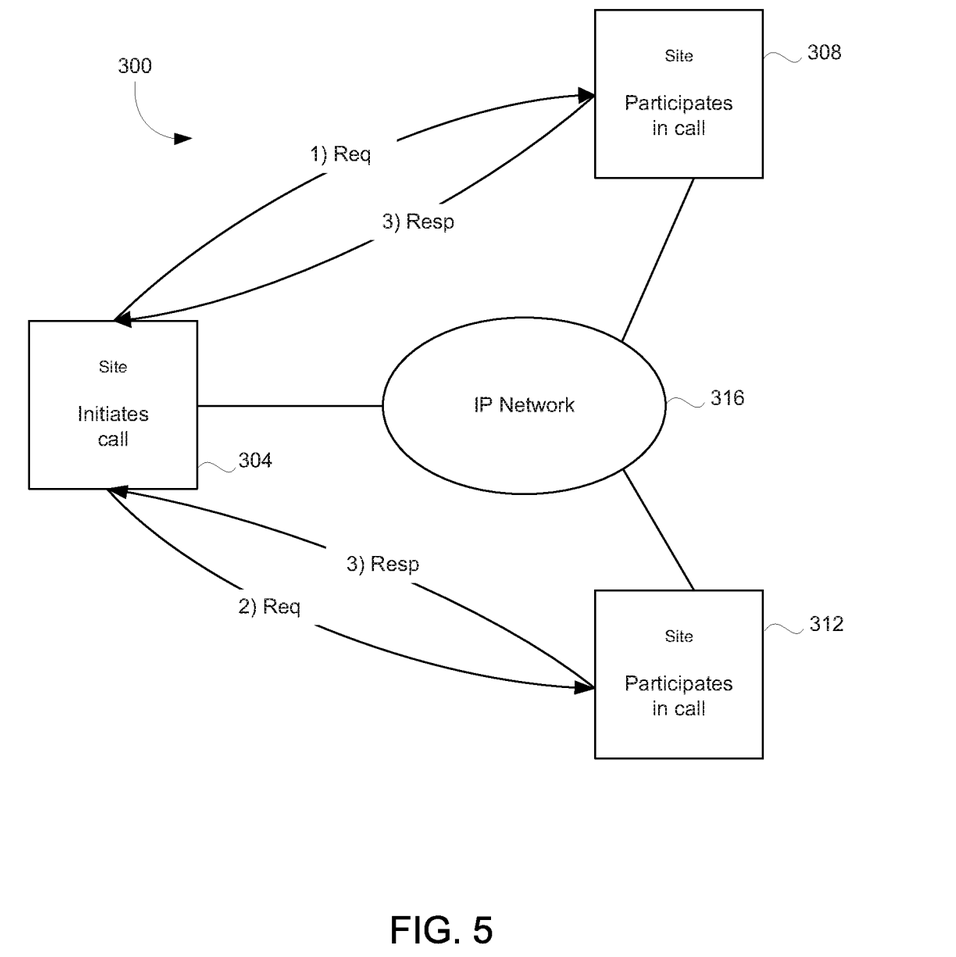
FIGS. 5 and 7 illustrate a call setup in a Land Mobile Radio system in accordance with an embodiment of the invention.

FIG. 5 illustrates an LMR system 300 that includes sites 304, 308 and 312 in accordance with an embodiment of the invention. The LMR system 300 does not require a bridge device for call setup or for voice traffic. The sites 304, 308 and 312 are interconnected by a data network such as an IP network 316. In one embodiment, each site may interface with the IP network 316 by a standard IP gateway router (not expressly shown in FIG. 5).

When a particular site is deployed in the system (e.g., system 300), it broadcasts a message periodically that is received by the other sites in the system. The broadcast message indicates the newly-deployed site's interest in a particular call or a set of calls. Additionally the newly-deployed site receives a similar message from other sites that informs the newly-deployed site about the interest of the other sites in a particular call or a set of calls. Consequently, all sites in the system become aware of all other sites and the talk group these sites are interested in. As will be appreciated, this dynamic auto discovery of newly-deployed sites allows deployment of sites without informing or configuring the existing sites.

Consider, for example, a scenario where the site 304 desires to initiate a call to the other sites in the LMR system 300. In other words, the site 304 wants to send voice messages to the sites 308 and 312. Prior to sending a voice message, the site 304 needs to send a request message via standard IP multicasting to each of the sites 308 and 312 and wait for an acknowledgement message from the sites 308 and 312. The request message asks if the site 304 may communicate with the sites 308 and 312, and the acknowledgement message confirms that the sites 308 and 312 are each willing to communicate with the site 304, thus essentially forming a talk group comprising the sites 304, 308 and 312.

In one embodiment, the request message includes the identification of the requesting site and the requested target group. Thus, the request message from the site 304 includes its own identification as well as the identification of the group that the site 304 is interested in. In one embodiment, the acknowledgement message from the sites 308 and 312 include their own identifications and an indication of their willingness to participate in the call.

Referring back to FIG. 5, it will be appreciated that in contrast to existing LMR systems, the call setup is performed without the assistance of a bridge device. Since the embodiment illustrated in FIG. 5 does not require a bridge device, the hop count for the call setup is significantly reduced. Also, call setup latency is decreased because call control is distributed among the sites, thus reducing a single choke point. Furthermore, removal of the bridge device removes a single point of failure since control and bearer plane traffic need no longer go through a bridge device.

Figure 6:
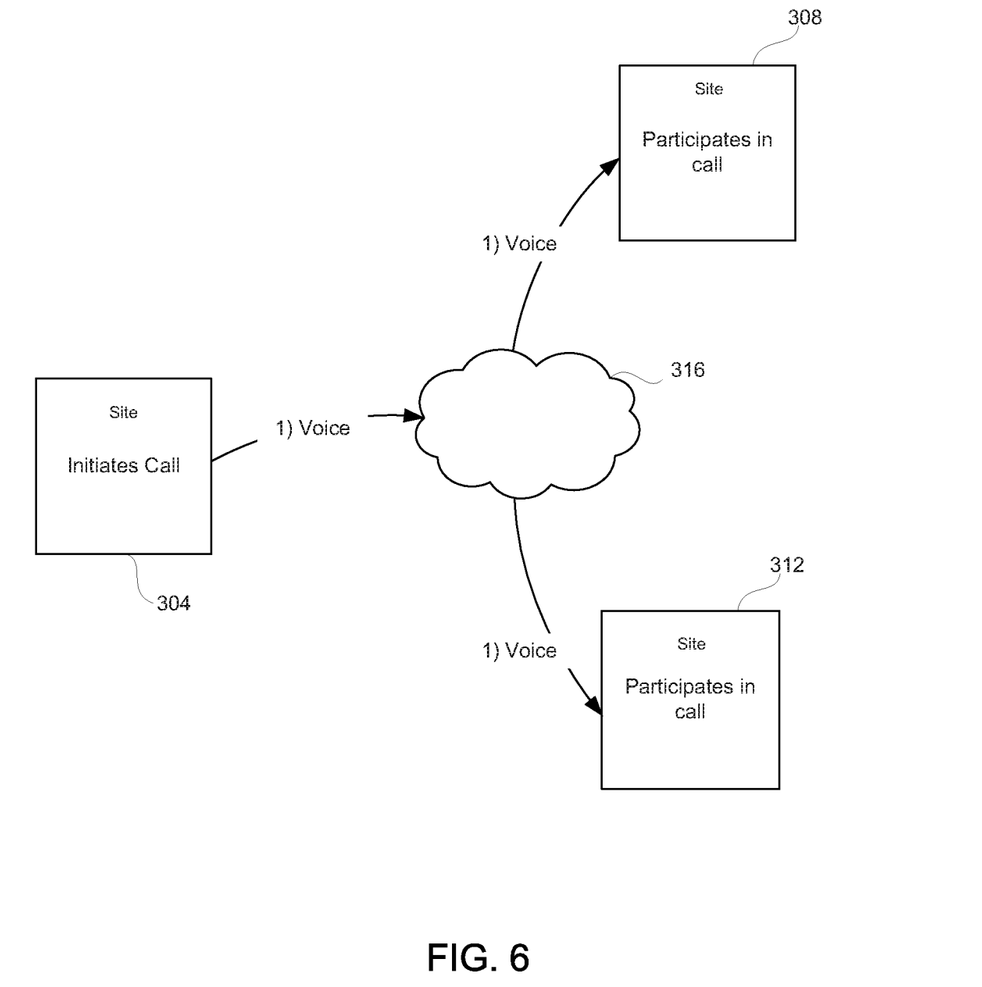
FIGS. 6 and 8 illustrate transmission and reception of voice messages among sites in accordance with one embodiment of the invention.

After the call setup is completed, a site proceeds to send voice messages to the other sites. FIG. 6 illustrates a voice message originating from the site 304 being transmitted to the sites 308 and 312. As discussed before, the sites 304, 308 and 312 are interconnected by the IP network 316. In one embodiment, a voice message originating from the site 304 is first packaged in standards based Real-Time Transport (RTP) packets.

In one embodiment, the voice message is sampled and encoded with a standard audio codec. The voice message samples are then packaged in RTP packets suitable for transport over the IP network 316. The RTP packets are then sent across the network.

In one embodiment, a standard Internet feature known as multicasting is employed to simultaneously send the voice packets to the sites 308 and 312. As will be understood by those skilled in the art, using multicasting, the same information can be sent simultaneously to many recipients using just one data stream. The multicast connection leverages the power of IP multicast to provide one-to-many, and by extension, a many-to-many communication mechanism. Thus, any site on the IP network 316 that is capable of listening or sending voice packets can participate in the talk group. The multicasting can be done by a standard IP gateway router on the IP network 316. The voice packets are simultaneously received and processed by the sites 308 and 312. Through the use of multicast, the bandwidth use for each site becomes uniform because the use of bandwidth by a particular site depends on the number of call the site is participating instead of the number sites in the system.

Figure 7:
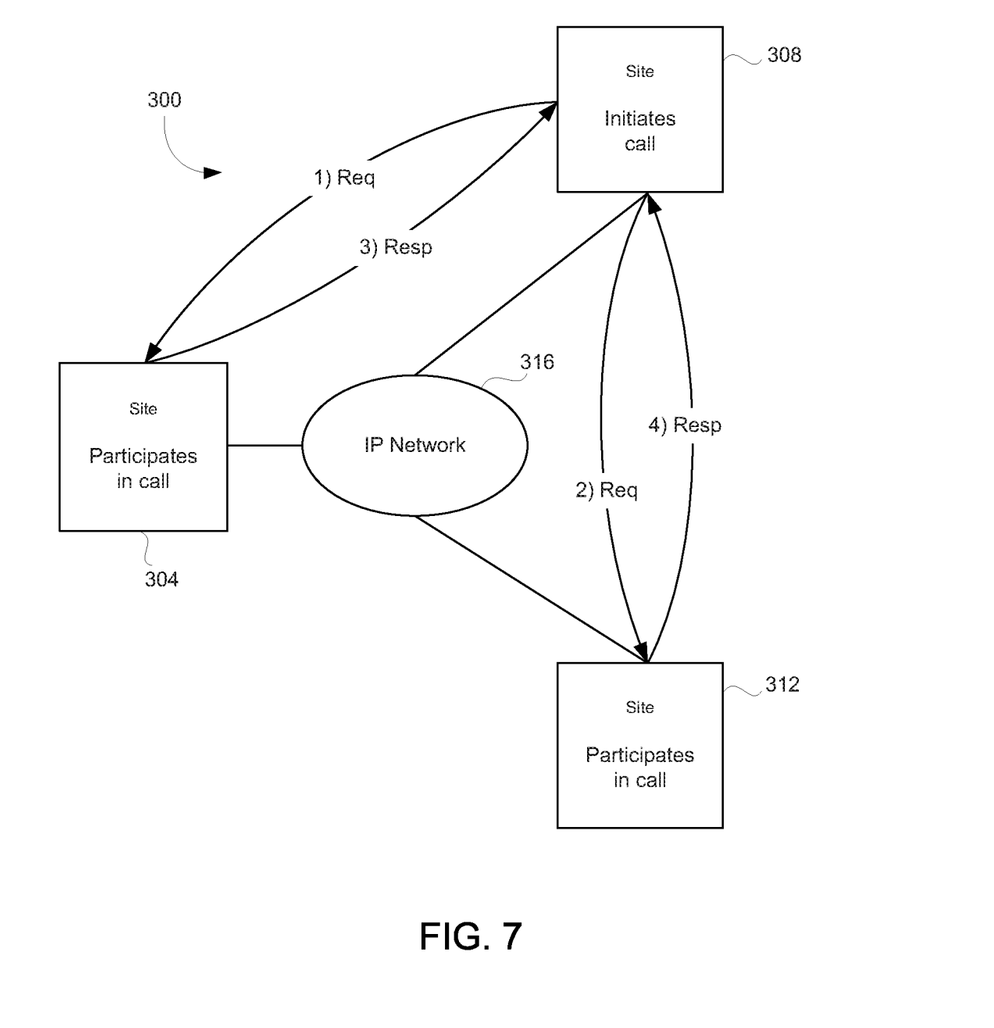
Figure 8:
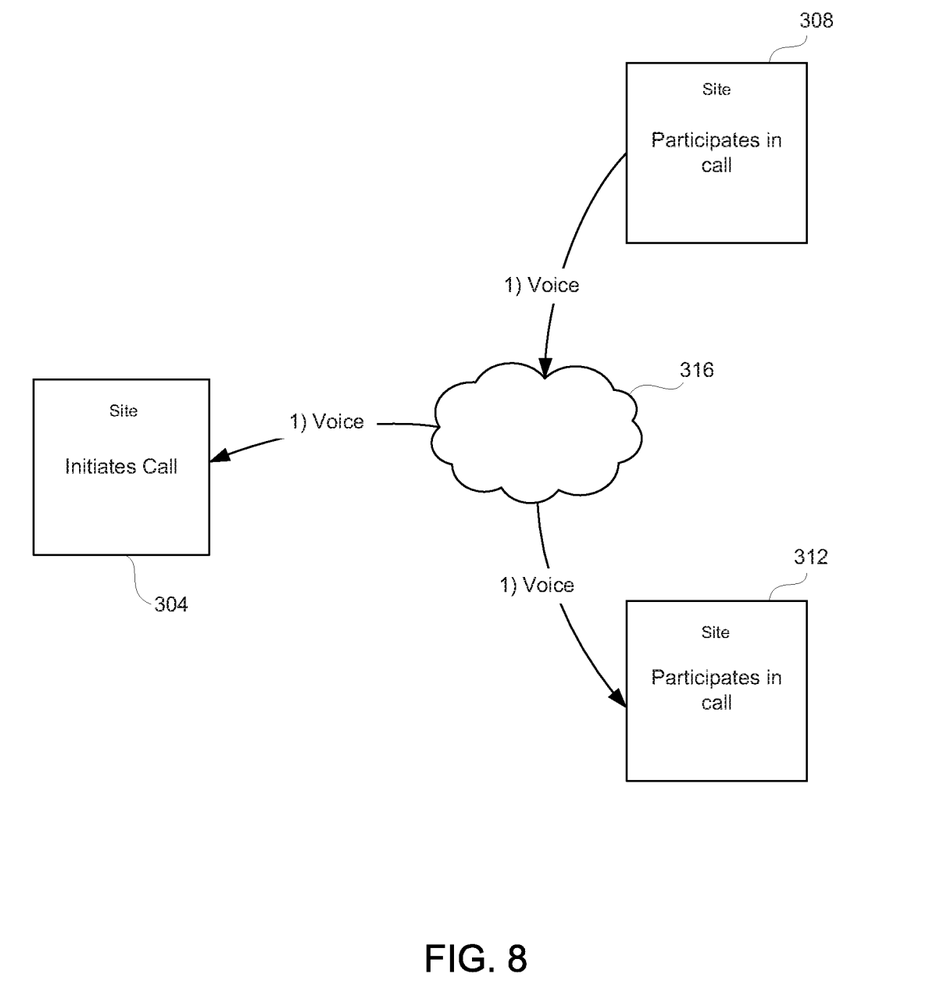

Once the site 304 completes transmitting the voice packets, the site 308 may desire to send voice packets to the sites 304 and 312. As illustrated in FIG. 7, the site 308 sends a call request message to the sites 304 and 312. Note that there is no need for a central controller or a bridge device, and the site initiating a call is responsible for the call setup. The sites 304 and 312 respond with call response message indicating that they are ready to receive the call. As illustrated in FIG. 8, once the call is set up, the site 308 sends the voice packets through standard IP multicasting to the sites 304 and 312. As can be appreciated, the site willing to initiate a call is responsible for setting up the call without the need for a central bridge device or a central controller. As a result, failure at one site limits the failure to that site only and does not affect the operation and performance of the remaining sites.

By way of examples, but not limitations, various aspects of the invention, such as peer-to-peer communication and dynamic discovery have been described above in connection with the sites. It will be apparent, however, to those skilled in the art that the various aspects of the invention can be used in connection with radio frequency sub-systems (RFSS), transceivers, high level elements comprising a plurality of RFSS or other elements of a communication system. Also, by way of examples, but not limitations, various aspects of the invention have been described in connection with a land mobile radio system. It will be apparent to those skilled in the art that the various aspects of the invention can be used in connection with other types of communication systems (i.e., non-LMR-type communication system).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for communication among a plurality of sites in a land mobile radio (LMR) system, the plurality of sites being interconnected by a data network, the method comprising:
    causing a site initiating a call request to operate as a control point for setting up a call within a talk group and thereby negotiate among participants of the talk group an assignment of multicasting source role for the call within the talk group to the site initiating the call request, including:
    (a) transmitting a call request message by an initiating site that intends to communicate with one or more sites in the system, the call request message being multicast over the data network to the participants of the talk group; and
    (b) receiving, by the initiating site, an acknowledgement message from the other sites that are participants in the talk group confirming their willingness to communicate with the initiating site, the acknowledgement message being unicast over the data network; and
    conducting the call within the talk group, wherein the site initiating the call request and receiving the acknowledgement message assumes the multicasting source role for the call, including:
    (a) transmitting, by the initiating site, a voice message, the voice message being multicast over the data network to the participants of the talk group; and
    (b) receiving the multicast voice message at the other sites.

2. The method of claim 1, wherein multicasting the voice message further comprises:
    packetizing the voice message into voice packets; and
    multicasting the voice packets.

3. The method of claim 1 further comprising:
    encoding the voice message with a standard audio codec; and
    packaging the encoded voice message in RTP packets suitable for transport over the IP network.

4. The method of claim 3 further comprising:
    receiving the packets; and
    decoding the packets.

5. The method of claim 1, wherein multicasting the call request message further comprises:
    packetizing the call request message into call request packets; and
    multicasting the call request packets.

6. The method of claim 1, wherein unicasting the acknowledgement message further comprises:
    packetizing the acknowledgement message into acknowledgement packets; and
    unicasting the acknowledgement packets over the data network.

7. The method of claim 1 wherein the sites are connected to the network by gateway routers.

8. The method of claim 1, wherein each site knows the identity of the other sites in the group that will receive its message.

9. The method of claim 1, wherein the sites transmit a periodic message in order to advertise their participation as a member of the group, wherein the members of the group receive messages from other members.

10. The method of claim 1, wherein the group is a talk group comprising a plurality of the sites that exchanges messages with each other.

11. The method of claim 1, wherein the data network is an IP network.

12. The method of claim 1, further comprising:
    configuring the sites to dynamically operate as control points on the data network by periodically broadcasting talk group participation information to one another over the data network and maintaining the talk group participation information at each site, including:
    (a) transmitting by the sites a respective first message, the respective first message including the identity of the transmitting site and a list of one or more sites from which each of the sites will accept messages; and
    (b) receiving at the sites the transmitted first messages, wherein each site having a list of a group of sites including from whom each member of the group will accept messages.

13. A method for communication among a plurality of sites in a land mobile radio (LMR) system, the plurality of sites being interconnected by a data network, comprising:
    causing a site initiating a call request to operate as a control point for setting up a call within a talk group and thereby negotiate among participants of the talk group an assignment of multicasting source role for the call within the talk group to the site initiating the call request, including:
    (a) transmitting a call request message by an initiating site that intends to communicate with one or more sites in the system, the call request message being multicast over the data network to the participants of the talk group; and
    (b) receiving, by the initiating site, an acknowledgement message from the other sites that are participants in the talk group confirming their willingness to communicate with the initiating site, the acknowledgement message being unicast over the data network.

14. The method of claim 13 further comprising:
    conducting the call within the talk group, wherein the site initiating the call request and receiving the acknowledgement message assumes the multicasting source role for the call, including:

(a) transmitting, by the initiating site, a voice message, the voice message being multicast over the data network to the participants of the talk group; and (b) receiving the multicast voice message at the other sites.

15. The method of claim 13 further comprising:

encoding the voice message with a standard audio codec; and packaging the encoded voice message in RTP packets suitable for transport over the data network.

16. The method of claim 13, wherein the data network is an IP network.

17. The method of claim 13, further comprising:

configuring the sites to dynamically operate as control points on the data network by periodically broadcasting talk group participation information to one another over the data network and maintaining the talk group participation information at each site, including:

(a) transmitting by the sites a respective first message, the respective first message including the identity of the transmitting site and a list of one or more sites from which each of the sites will accept messages; and (b) receiving at the sites the transmitted first messages, wherein each site having a list of a group of sites including from whom each member of the group will accept messages.

18. The system of claim 13, wherein multicasting of the voice message includes sending voice packets across the network as a group.

19. The system of claim 13, wherein the sites are connected to the network by gateway routers.

20. The system of claim 13, wherein each site knows the identity of the other sites in the group that will receive its message.

21. The system of claim 13, wherein the sites transmit a periodic message in order to advertise their participation as a member of the group, wherein the members of the group receive messages from other members.

* * * * *

UNITED STATES PATENT AND TRADEMARK OFFICE
CERTIFICATE OF CORRECTION

PATENT NO. : 8,483,114 B2
APPLICATION NO. : 13/251895
DATED : July 9, 2013
INVENTOR(S) : Arindam Roy et al.

It is certified that error appears in the above-identified patent and that said Letters Patent is hereby corrected as shown below:

In the Claims:

At column 8, claim number 18, line number 7, delete "system" and add -- method --

At column 8, claim number 19, line number 10, delete "system" and add -- method --

At column 8, claim number 20, line number 12, delete "system" and add -- method --

At column 8, claim number 21, line number 15, delete "system" and add -- method --

Signed and Sealed this
Sixteenth Day of August, 2016

Michelle K. Lee
*Director of the United States Patent and Trademark Office*